(12) United States Patent
White et al.

(10) Patent No.: US 6,515,822 B1
(45) Date of Patent: Feb. 4, 2003

(54) MODULAR DATA STORAGE SYSTEM WITH EXPANDABLE VERTICAL LIFT MECHANISM

(75) Inventors: Joseph M White, Windsor, CO (US); Matthias A Lester, Fort Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/311,831

(22) Filed: May 13, 1999

(51) Int. Cl.[7] .......................... G11B 15/68; G11B 17/22; G11B 33/02
(52) U.S. Cl. ...................................... 360/92; 369/30.39
(58) Field of Search ................................ 360/92, 98.04, 360/98.05, 98.06; 369/34, 36, 38, 178, 179, 191, 192, 30.39, 30.63, 31.01

(56) References Cited

U.S. PATENT DOCUMENTS

| | | | |
|---|---|---|---|
| 4,504,936 A | * | 3/1985 | Faber et al. .................. 369/34 |
| 5,101,387 A | | 3/1992 | Wauger et al. ................. 369/36 |
| 5,455,810 A | | 10/1995 | Luffel ........................... 369/36 |
| 5,544,146 A | | 8/1996 | Luffel et al. ................. 369/178 |
| 5,646,917 A | * | 7/1997 | Miyoshi et al. ................. 369/34 |
| 5,870,245 A | * | 2/1999 | Kersey et al. ................. 360/92 |
| 5,940,356 A | * | 8/1999 | Toumbas ...................... 369/36 |
| 6,116,063 A | | 9/2000 | Foslien .......................... 70/58 |
| 6,240,058 B1 | * | 5/2001 | Pitz et al. .................... 369/178 |

* cited by examiner

Primary Examiner—David L. Ometz (57) ABSTRACT

A data storage system comprising: a plurality of vertically stacked modular housing units, each modular housing unit comprising a plurality of data storage media receiving devices; a data storage media handling device adapted to laterally displace media between the media receiving devices; a vertical lift mechanism attached to the data storage media handling device and adapted to vertically displace the handling device along a vertical displacement path extending adjacent to the vertically stacked modular housing units and comprising a drive assembly fixedly positioned with respect to the modular housing units and a linkage mechanism connected between the drive assembly and the handling device.

7 Claims, 11 Drawing Sheets

MODULAR DATA STORAGE SYSTEM WITH EXPANDABLE VERTICAL LIFT MECHANISM

FIELD OF THE INVENTION

The present invention relates generally to data storage systems for handling and storing data storage media devices such as data cartridges, and more particularly to a modular data storage system having an expandible vertical lift mechanism.

BACKGROUND OF THE INVENTION

Data storage in the computer industry is accomplished in a number of ways. For example, data may be stored on various data storage media devices such as tapes, compact disks, "floppy" or "hard" disks, and the like. Oftentimes, data storage media which is transferrable from one location to another is housed within a parallelepiped-shaped cartridge. It is to be understood that the term "cartridge" or "data cartridge" as used in the present application encompasses any data storage media device, whether or not it is housed within a cartridge.

Data storage systems are used to store data cartridges at known locations and to retrieve desired cartridges so that data may be written to or read from the cartridges. A typical data storage system may include different types of cartridge receiving devices. For example, one type of cartridge receiving device is a cartridge storage rack or "magazine" which has a plurality of individual cartridge storage locations. Another type of cartridge receiving device is a cartridge read/write device or "drive". A data storage system may also include a cartridge handling assembly for retrieving data cartridges and translating them among cartridge receiving devices (e.g., from a cartridge storage location to a drive and vice-versa).

Data storage systems may be produced in a variety of sizes and configurations. One type of data storage system has a guide track extending along the length of a central vertical shaft. A data cartridge handling assembly or "picker" assembly is vertically displaceable along the track and is adapted to move data cartridges between cartridge receiving devices positioned adjacent to the central vertical shaft in vertically stacked layers or tiers. In some storage systems of this type all components are provided in a single housing unit. In other storage systems of this type a plurality of modular housing units are stacked one on top of the other to provide a compound housing assembly. In a compound housing assembly each modular housing unit contains a portion of the vertical shaft and one or more of the tiers of cartridge receiving devices of the data storage system. Such an assembly of modular units is disclosed in U.S. patent application Ser. No. 09/137,350 filed Aug. 20, 1998 of White, Jones, and Lester for MODULAR DATA STORAGE SYSTEM, which is hereby incorporated for all that it discloses. An advantage of an integral data storage system having multiple vertically stacked tiers over multiple, independent, single tier units is that it obviates the need to coordinate the operation of multiple systems. Also, unnecessary duplication of certain system components, such as drives and pickers, is avoided.

In the data storage system disclosed in Ser. No. 09/137, 350 referenced above, the picker assembly is moved vertically by drive force applied from a motor which is mounted and displaceable with the picker assembly.

Other data storage systems are disclosed in the following patents and patent applications, each of which is specifically incorporated herein by reference for all that it discloses: U.S. Pat. No. 5,101,387 dated Mar. 31, 1992 (Ser. No. 298,388 filed Jan. 18, 1989) for LATERAL DISPLACEMENT CONTROL ASSEMBLY FOR AN OPTICAL DISK HANDLING SYSTEM of Mark E. Wanger, Jennifer L. Methlie, Donald J. Stavely, and Thomas C. Oliver; U.S. Pat. No. 5,455,810 issued Oct. 3, 1995 (Ser. No. 254,049 filed Jun. 3, 1994) for FLEXIBLE MEMBER TENSIONING APPARATUS of Robert Luffel; U.S. Pat. No. 5,544,146 issued Aug. 6, 1996 (Ser. No. 90/004,454 filed Nov. 14, 1996) for CARTRIDGE HANDLING SYSTEM of Robert W. Luffel, D. Scott Paul and Jon D. Rugg; U.S. patent application (Ser. No. 09/179,793 filed Oct. 27, 1998) for MAIL SLOT DATA CARTRIDGE EXCHANGE SYSTEM FOR USE WITH A DATA STORAGE SYSTEM of Nicholas D. Thayer, Robert W. Luffel, David P. Jones, and Mark A. Smith; U.S. patent application Ser. No. 09/271,550 filed Mar. 18, 1999 for METHOD AND APPARATUS FOR EXCHANGING DATA CARTRIDGES IN A JUKEBOX DATA STORAGE SYSTEM of Robert L. Mueller, Paul C. Coffin, and Robert W. Luffel; U.S. patent application Ser. No. 09/257,322 filed Feb. 25, 1999 for DATA CARTRIDGE EXCHANGE APPARATUS of Robert L. Mueller, David P. Jones, Robert W. Luffel, and Mark A. Smith.

SUMMARY OF THE INVENTION

The present invention may comprise a data storage system having a plurality of vertically stacked modular housing units. Each modular housing unit includes a plurality of data storage media receiving devices. The system also includes a data storage media handling device adapted to laterally displace media between the media receiving devices. The system has a vertical lift mechanism attached to the data storage media handling device which is adapted to vertically displace the handling device along a vertical displacement path extending adjacent to the vertically stacked modular housing units. The vertical lift mechanism includes a drive motor fixedly positioned with respect to the modular housing units and a linkage mechanism connected between the drive motor and the handling device.

The invention may also comprise an expansion kit for a data storage system which includes an original plurality of vertically stacked modular housing units, each modular housing unit comprising a plurality of data storage media receiving devices; a data storage media handling device adapted to laterally displace media between the media receiving devices; and an original vertical lift mechanism attached to the data storage media handling device and adapted to vertically displace the handling device along a vertical displacement path extending adjacent to the vertically stacked modular housing units and comprising a drive motor fixedly positioned with respect to the modular housing units and an original linkage mechanism connected between the drive motor and the handling device. The expansion kit may include at least one additional modular housing unit connectively stackable with the original vertically stacked housing units and a linkage mechanism replacement unit having a configuration dependent upon the number of modular housing units in the data storage system and operably connectable between portions of the original vertical lift mechanism when the additional modular housing unit(s) is/are operably stackably connected with the original vertically stacked modular housing units.

The invention may also comprise a method of expanding a data storage system such as described in the previous paragraph comprising: vertically stackingly adding a modular housing unit to the original plurality of vertically stacked modular housing units; and replacing the original linkage mechanism with a replacement linkage mechanism having a different length.

BRIEF DESCRIPTION OF THE DRAWINGS

Illustrative and presently preferred embodiments of the invention are shown in the accompanying drawings in which.

DETAILED DESCRIPTION OF THE INVENTION

The drawings, in general, disclose a data storage system 10 comprising a plurality of vertically stacked modular housing units 12, 13, 14. Each modular housing unit has a plurality of data storage media receiving devices 40. A data storage media handling device 50 is adapted to laterally displace media between the media receiving devices 40. A vertical lift mechanism 58 is attached to the data storage media handling device 50 and is adapted to vertically displace the handling device 50 along a vertical displacement path 19 extending adjacent to the vertically stacked modular housing units 12, 13, 14. The vertical lift mechanism 58 includes a drive motor assembly 80 fixedly positioned with respect to the modular housing units 12, 13, 14. A linkage mechanism 70 is connected between the drive motor assembly 80 and the handling device 50. At least a portion of the linkage mechanism 70 is readily replaceable to enable expansion of the data storage system by addition of housing modules thereto.

Figure 1:
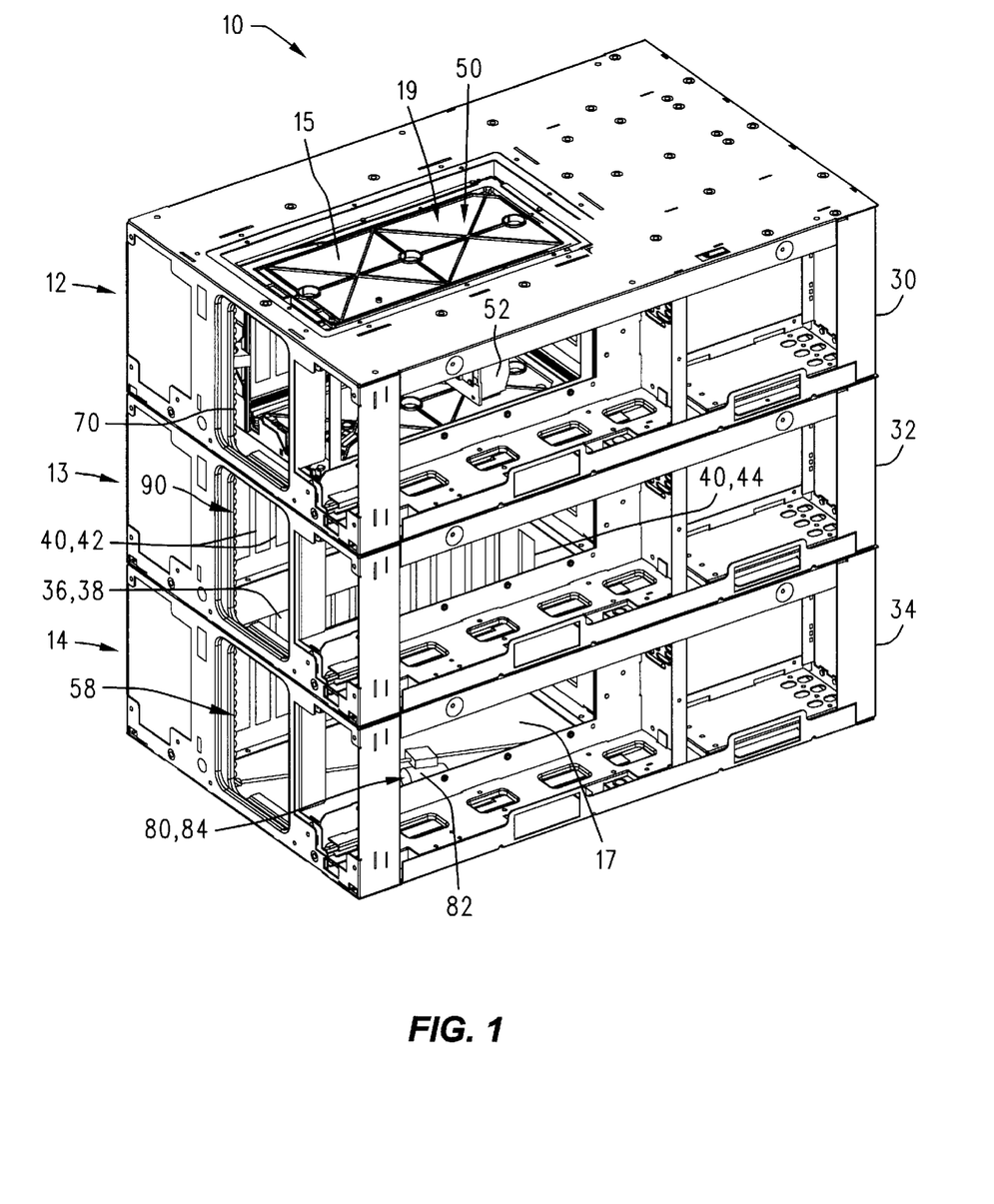
FIG. 1 is an isometric view of a modular data storage system.

Having thus generally described a data storage system 10, various embodiments thereof will now be described in detail. One embodiment of a modular data storage system 10 is shown in FIG. 1 and comprises two or more modular units 12, 13, 14. The modular units 12, 13, 14 are stackable vertically upon one another to form a compound housing assembly. While three modular units are shown in FIG. 1, it is to be understood that as few as two, or as many modular units as a customer desires, may be utilized in the modular data storage system 10. Furthermore, one or more modular units may be added to (or subtracted from) the modular data storage system 10 at any time. The modular data storage system 10 also comprises a cartridge (media) handling assembly 50 (generally referred to in the art as a "picker assembly" or "picker") which may be vertically translated along an open shaft 19 extending through the modular units 12, 13, 14 and having a first end 15 and a second end 17, as described in further detail below.

In one embodiment the modular units 12, 13, 14 are substantially identical to one another, except where noted otherwise below. Each modular unit 12, 13, 14 may comprise a housing shell 30, 32, 34, each having an upper opening, e.g., 36 and a lower opening, e.g., 38, FIG. 2. Each of the openings 36, 38 are sized and shaped to allow the cartridge handling assembly 50 to pass therethrough along a displacement path 19 which extends through all of the modules 12, 13, 14. Each modular unit 12, 13, 14 may further comprise a plurality of cartridge receiving devices 40 which may be, for example, storage slots, magazines (e.g., 42) or drives (e.g., 44), or any combination thereof. The configuration of cartridge receiving devices 40 within each modular unit need not be identical; each modular unit may be configured to suit a customer's particular needs.

Figure 2:
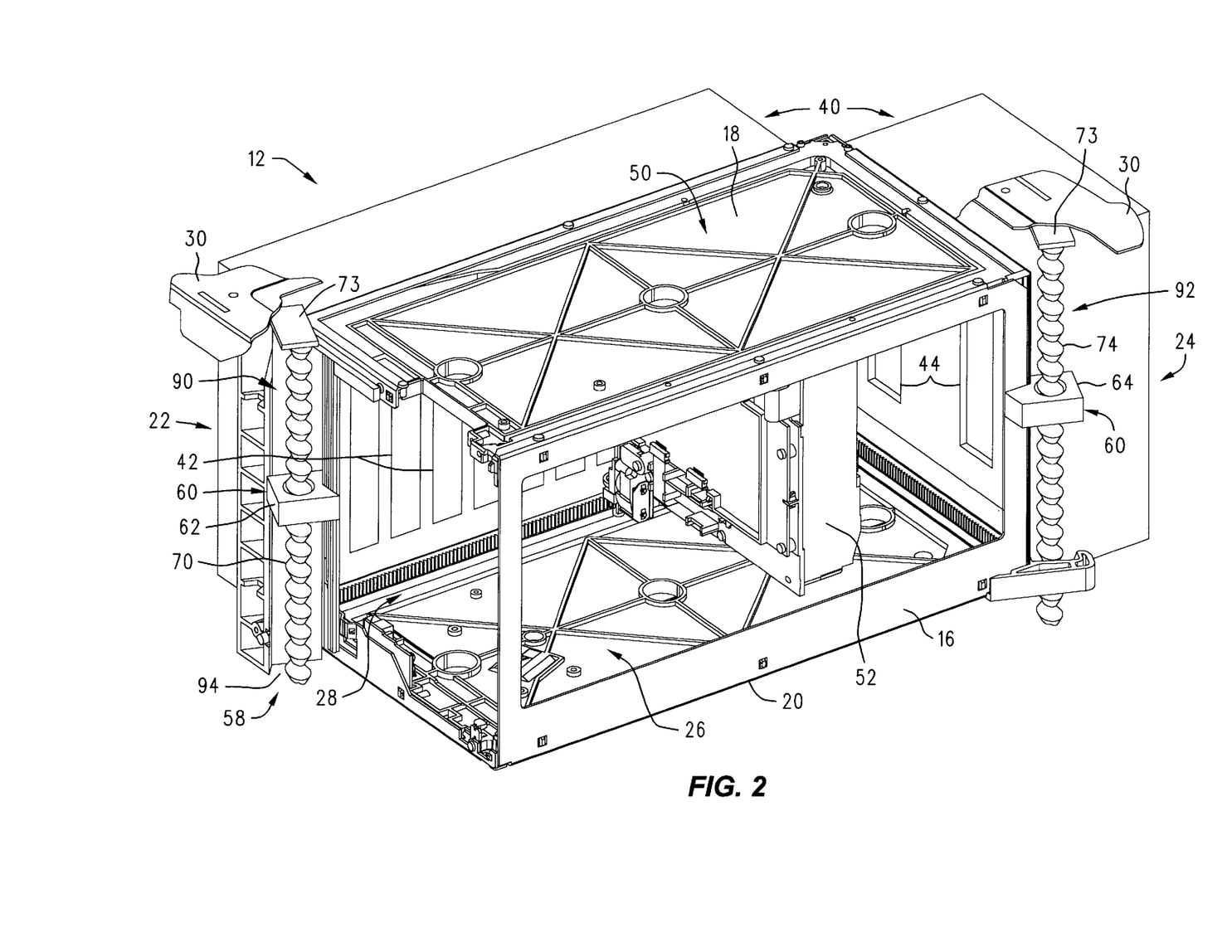
FIG. 2 is an isometric view of a modular unit from the modular data storage system of FIG. 1, with most of the housing broken away.

The cartridge handling assembly 50 may be of the type described in U.S. patent application Ser. No. 09/045,134 filed Mar. 20, 1998 for MULTI-PLANE TRANSLATING CARTRIDGE HANDLING SYSTEM of Schmidtke et al., which is hereby incorporated by reference for all that is contained therein. FIG. 2 illustrates a modular unit 12 with most of the housing 30 broken away to more clearly show the cartridge handling assembly 50.

As shown in FIG. 2, the cartridge handling (picker) assembly 50 may comprise a generally rectangular frame 16 having an upper portion 18, a lower portion 20, and four sides 22, 24, 26, 28. Cartridge receiving devices 40 (magazines 42 and drives 44) are preferably accessible from at least one, and most preferably two or more, of the sides 22, 24, 26, 28. The cartridge handling assembly 50 may also comprise a cartridge access device 52 capable of loading and retrieving the data cartridges (not shown) from the cartridge receiving devices 40.

As shown in FIGS. 1 and 2, the modular data storage system 10 may also comprise a vertical lift system 58 for vertically translating the cartridge handling assembly 50 among the adjacent modular units 12, 13, 14. The vertical lift system 58 may comprise a threaded nut assembly 60 mounted on the cartridge handling assembly 50. The vertical lift system 58 may further comprise a lead screw assembly 70 operably received in the threaded nut assembly 60. The vertical lift system 58 may further comprise a drive actuator/motor assembly 80 stationarily mounted with respect to the modular units 12, 13, 14 (as by mounting brackets, screws, or the like), which is drivingly linked to the lead screw assembly 70.

The threaded nut assembly 60 may comprise a first nut 62 and a second nut 64, mounted diagonally opposite one another as shown in FIG. 2. The lead screw assembly 70 as shown in FIG. 2 may comprise a first lead screw 72 and a second lead screw 74 mounted in the housing 30 diagonally opposite one another and threadingly received in the nuts 62, 64, respectively. Each lead screw 72, 74 is rotatably mounted at opposite ends thereof to the modular unit housing 30 by an upper and lower bearing block 71, 73. The actuator/motor assembly 80 is preferably comprised of an electric motor 82 and a drive train such as a conventional gear/shaft assembly 84 which operably connects the motor 82 to the lead screw assembly 70. Each modular housing unit 12, 13, 14 has an open portion 90, 92 extending therethrough associated with each lead screw 72, 74. These open portions 90, 92 are lateral extensions of the picker displacement path 19 into which the threaded nuts 62, 64 extend. These open portions 90, 92 terminate in each module, in top and bottom openings 94 which remain uncovered except in the top and bottom of housing modules 12 and 14, respectively. In top module 12 the top opening is covered by a mounting plate portion of bearing block 73 which may be attached to the top face of the module 12 as by screws, welding or other mounting techniques. The opening 94 at the bottom of module 14 may be similarly covered with a fixedly mounted bearing block (not shown).

The modular data storage system 10 described above may be expanded by adding additional modular units. In such an expansion the lead screws 72, 74 are replaced by longer, but otherwise substantially identical lead screws which are mounted in the upper and lower bearing blocks. To accomplish this expansion the top bearing block 73 may be removed and thereafter the lead screws 72, 74 may be removed. Next the one or more expansion modules are stacked on top of module 12. Next the longer lead screws are inserted in open portions 90, 92; threaded through nuts 62, 64; rotatably attached to bottom bearing blocks and then rotatably attached to upper bearing blocks 73 which are subsequently fixedly attached to the top module. Alternatively, procedures, such as leaving the top bearing blocks in place in module 12 and using it as the top module of the new stack, could also be used as described further below.

Figure 3:
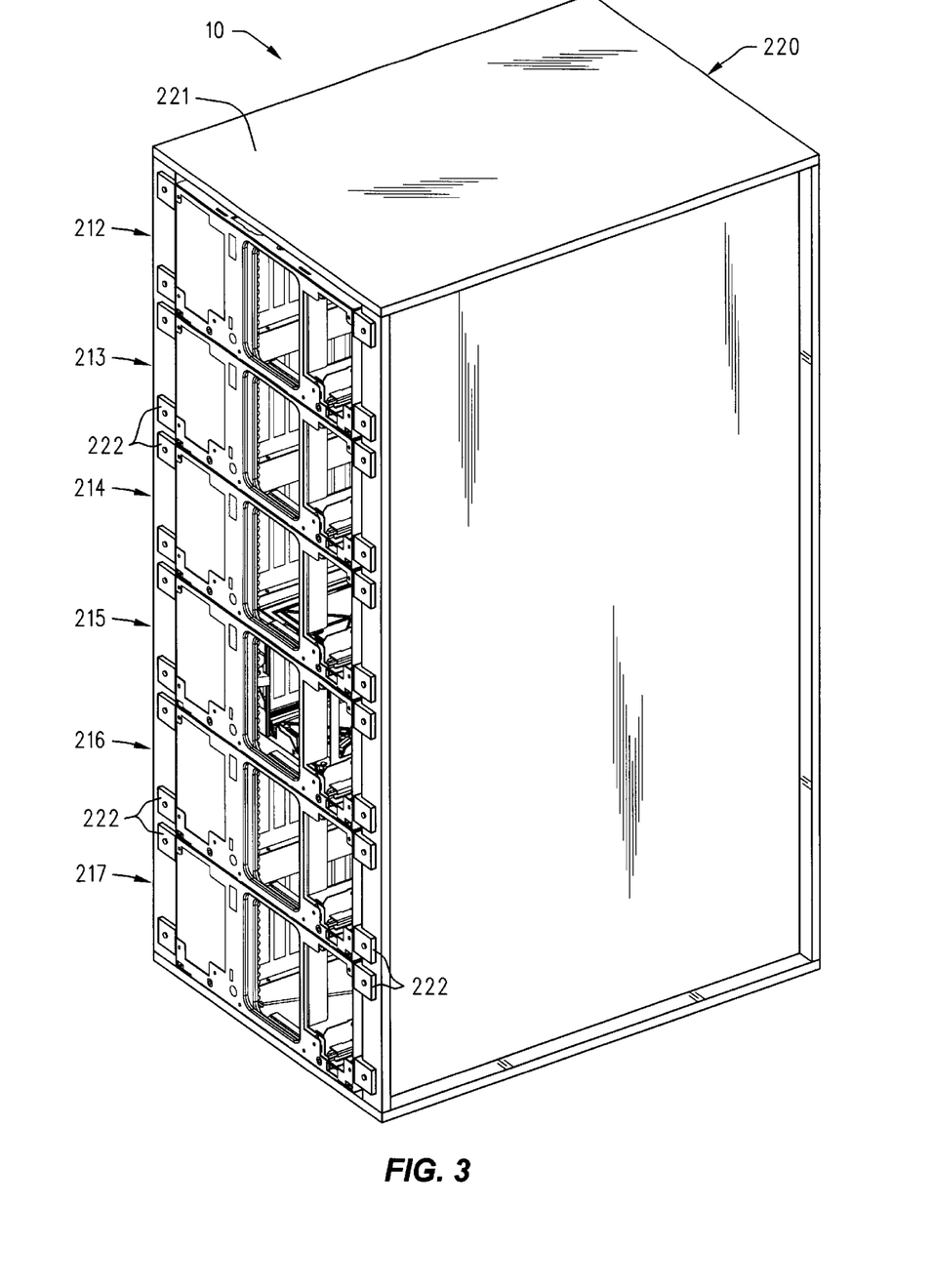
FIG. 3 is an isometric view of modular units from the modular data storage system of FIG. 1 mounted within a rack mount type housing.
Figure 10:
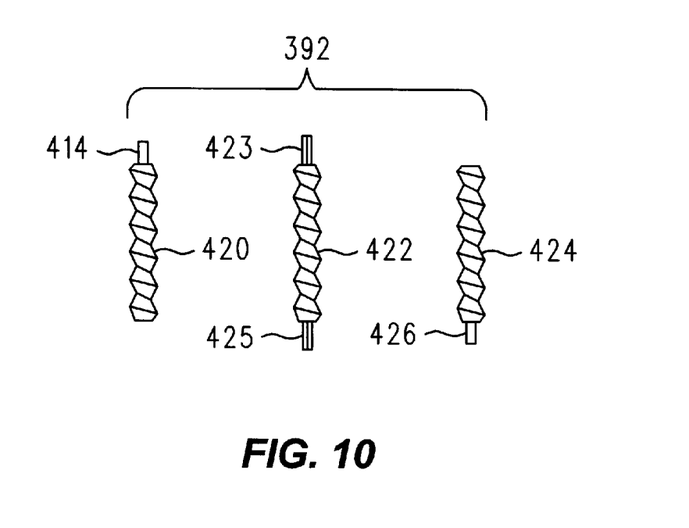
FIG. 10 is a side elevation view of three connectable portions of a lead screw.

In an alternative embodiment shown in FIG. 3, the modular units 212–217 of the modular data storage system 210 are placed within a conventional rack mount housing 220. The housing 220 may comprise a plurality of attaching devices 222, such as the L-shaped brackets shown in FIG. 3, which are adapted to fixedly is attach the modular units 212–217 to the housing 220. The attaching devices 222 may be fixedly attached to the rack mount housing 220 using a screw or the like. Each of the modular units 212–217 may be inserted into the rack housing 220 and then fixedly attached to several of the attaching devices 222 by screws or the like. It is to be understood that, while L-shaped brackets are shown in FIG. 3, any conventional attaching device may be used to attach the modular units to the rack mount housing, as long as the attaching device does not interfere with the vertical translation of the cartridge handling assemblies 50 among the adjacent modular units. The modular units 212–217 may alternatively be directly attached to the rack housing 220. The size of the rack mount housing 220 (and number of attaching devices 222 the housing 220 can accommodate) may be determined in accordance with a customer's requirements. The modular units may have front covers or bezels mounted over the front faces thereof such as described in U.S. patent application Ser. No. 09/295,491 filed Apr. 20, 1999 for BEZEL ASSEMBLY AND METHOD OF PRODUCTION of Wayne E. Foslien, et al., which is hereby specifically incorporated by reference for all that is disclosed therein. In this embodiment, expansion may require removal of the top plate 221 of rack 220 in order to insert the new lead screw unless it is installed in component pieces, as shown in FIG. 10.

It can be seen from the above description that each of the modular units 12, 13, 14 may have many common components, such as the housing, racks, drives and magazines. A single cartridge handling assembly 50 may be used to access the drives and magazines of all of the modular units as well as any further unit(s) that may be subsequently added. This replication of components provides many advantages to the manufacturer as well as low-end, mid-range, and high-end customers, since a single set of components could be used to supply an entire family of data storage systems. The only original component that may generally not be entirely reused in an expansion is the lead screw(s). In one embodiment described below, however, even portions or all of the original lead screw(s) are reused in the expanded system.

Having thus described two specific expandible data storage system embodiments 10 and 210, further variations of the expandible vertical lift system 58 will now be described.

Figure 4:
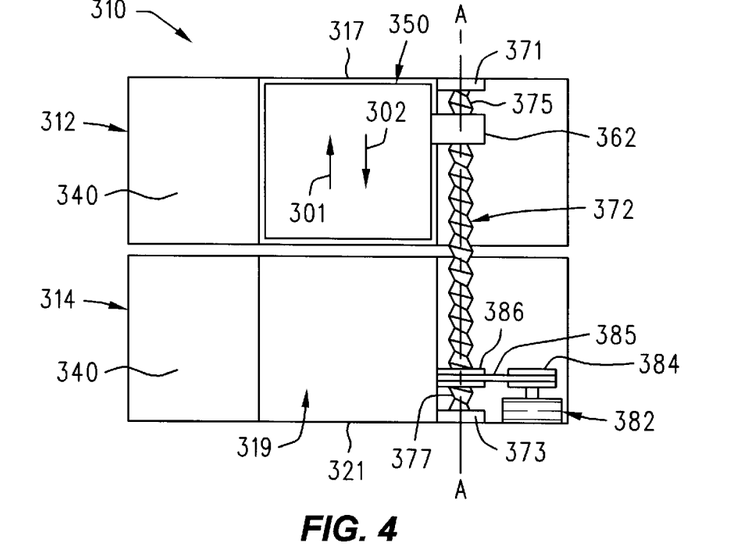
FIG. 4 is a schematic cross sectional elevation view of a modular data storage system.

FIG. 4 is a schematic illustration of a data storage system 310 having a first housing module 312 and a second housing module 314 positioned in a vertically stacked array. The housing modules have an interior picker displacement path 319 having an upper end 317 and a lower end 321. Data storage media access locations 340 are provided adjacent the picker displacement path 319. A picker assembly 350 is vertically displaceable within the picker displacement path in an upward direction 301 and a downward direction 302. Picker assembly 350 has a threaded nut 362 fixedly mounted on one side thereof. The nut 362 is threadingly received in a lead screw 372 which causes the nut to move upward or downward in response to rotation of the lead screw 372 in a first direction or an opposite second direction about axis AA. The lead screw 372 has a first end 375 and a second end 377 rotably mounted in an upper bearing block 371 and a lower bearing block 373 respectively. The upper bearing block 371 is fixedly attached to an upper wall portion of the first module 312 and the lower bearing block 373 is fixedly mounted on a base portion of the lower module 314.

A motor/actuator 382 which may be for example a conventional electric step motor is fixedly mounted within one of the housing modules and is drivingly connected to the lead screw 372 for causing rotation of the lead screw in a first direction or a second direction in response to command signals from a control unit (not shown). Control of a drive motor to drive a lead screw to cause vertical displacement of an attached picker is known in the art. In the embodiment illustrated in FIG. 4 the motor 382 is provided with a first rotable gear 384 which is drivingly linked by a drive chain 385 to a second gear 386 which is fixedly attached to the lead screw 372. Rotation of the drive motor 382 shaft in turn causes rotation of the lead screw 372 which causes vertical displacement of the nut 362 and the attached picker 350. Thus, the picker 350 is vertically displaceable within the picker displacement path 319 and is thereby positionable adjacent to and in engageable relationship with media stored in media locations 340 in both the upper housing module 312 and the lower housing module 314.

Figure 5:
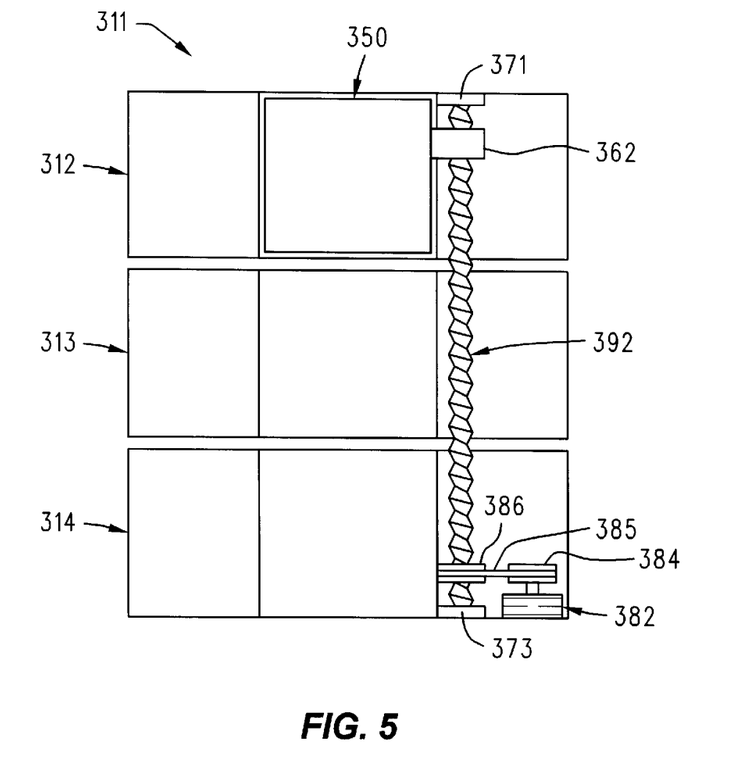
FIG. 5 is a schematic cross sectional side elevation view of a modular data storage system which is an expansion of the data storage system shown in FIG. 4.
Figure 6:
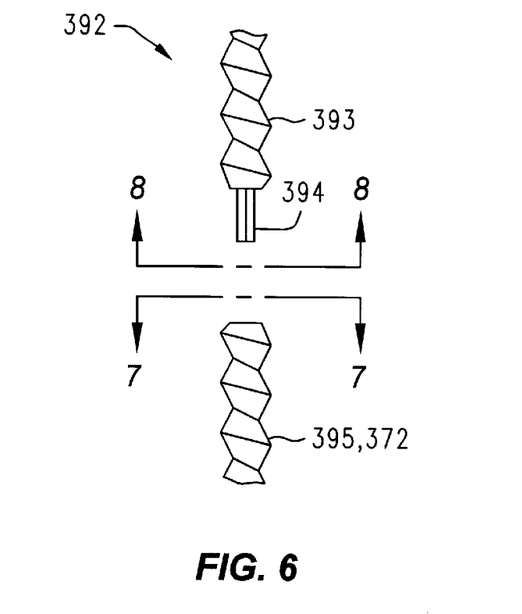
FIG. 6 is a detail elevation view of portions of a lead screw.
Figure 7:
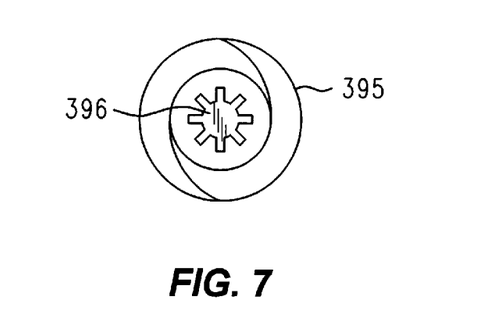
FIG. 7 is an end view of a lead screw portion shown in FIG. 6.
Figure 8:
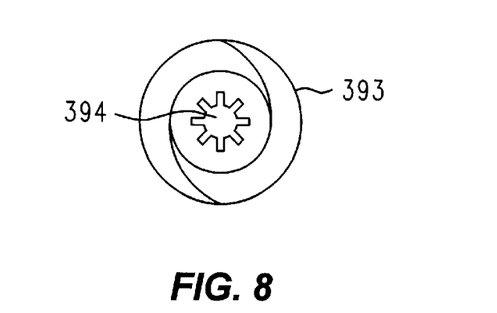
FIG. 8 is an end view of a lead screw portion shown in FIG. 6.
Figure 9:
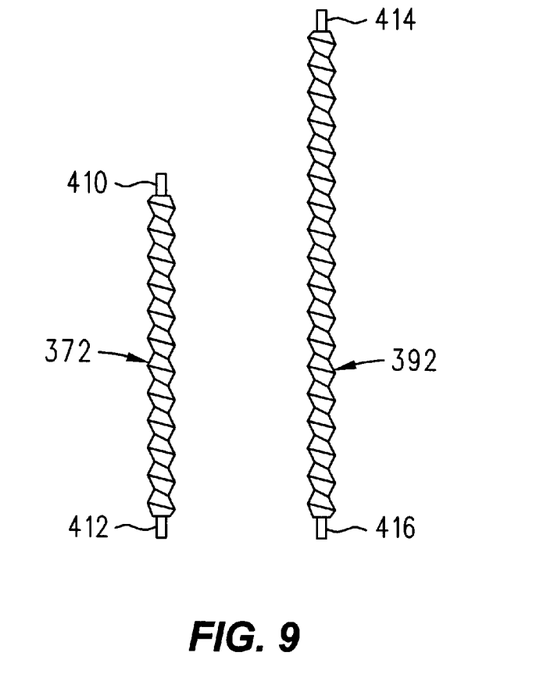
FIG. 9 is a side elevation view of a lead screw and a replacement lead screw.

FIG. 5 illustrates an expanded data storage system 311 having vertically stacked housing modules 312, 313, 314. Data storage system 311 is essentially identical to data storage system 310 except that an additional housing module 313 is provided between housing module 312 and housing module 314 and lead screw 372 has been replaced by a longer lead screw 392. Lead screw 392 may be a single integrally formed lead screw having the additional length needed to span the additional module 313 added to the housing modular stack in expanded data storage system 311. Alternatively, the replacement lead screw 392 may be formed from component lead screw portions. In one embodiment as illustrated in FIG. 6 the lead screw 392 is formed by a first portion 393 and a second portion 395 attached together by a spline or key member 394 received in spline holes such as 396 provided in each of the portions 393, 395. In one embodiment portion 395 is original lead screw 372 from which the end member 410, FIG. 9, which is journaled to the upper block 371, has been removed and replaced by the spline 394. As shown in FIG. 9 both the original lead screw 372 and the replacement lead screw 392 comprise upper and lower rotary shaft portions 410, 412 and 414, 416 respectively, which may be attached thereto by a spline portion (not shown) thereof which is received in a spline hole such as 396 illustrated in FIG. 7.

FIG. 10 illustrates an embodiment of a rotary shaft 392 in which the shaft is provided in an upper portion 420, a middle portion 422, and a lower portion 424. The upper portion has a first rotary shaft portion 414 attached thereto as by a spline portion and the lower portion 424 has a lower rotary shaft portion 426 which may be similarly attached. The intermediate portion 422 is attached to the upper portion 420 and the lower portion 424 as by splines 423, 425. In a slightly different configuration containing any number of shaft portions, each intermediate portion has a spline member positioned at the top and a spline accepting hole at the bottom. Each portion 420, 422, 424 has a length adapted to accommodate a single associated module such as modules 312, 313, 314, respectively. It is to be appreciated that a shaft 392 may be provided in multiple portions equal to the number of housing modules in the associated data storage system 10. One advantage of providing a shaft 392 from portions equal in number to the number of housing modules is that any length lead screw may be provided simply by maintaining a supply of component shaft portions such as 422. One shaft portion may be added to the existing shaft for each module which is added to the data storage system. Another advantage of this arrangement is that the upper portion 420 of the lead screw may remain rotably attached to the upper bearing block 371 and threadingly received within the picker nut 362 during the expansion process. The lower portion 422 may similarly remain connected to the drive gear 386 and associated motor 382 and may remain journaled in block 373 during the expansion process. Thus, in order to expand a two module data storage system such as 310 in FIG. 4 to a three module data storage system such as 311 shown in FIG. 5 the picker 350 would initially be moved entirely into either the upper or lower most module (e.g., 312 as shown in FIG. 4). Next the upper module 312 is lifted off the lower module 314, in the process separating an upper lead screw portion 420 from a lower lead screw portion 424. Next a third module 313 is positioned between the top module 312 and bottom module 314 and an intermediate lead screw portion 422 having splines 423 and 425 is inserted and connected to the upper and lower separated lead screw portions. Thus, an expanded data storage system 311 is provided and a longer lead screw 392 is provided without detaching the original portions 420, 424 of the lead screw from the associated upper and lower modules 312 and 314. Of course, this same basic methodology may be applied to add multiple modules and multiple intermediate lead screw portions such as 422 to any modular data storage system of two or more modules.

Figure 11:
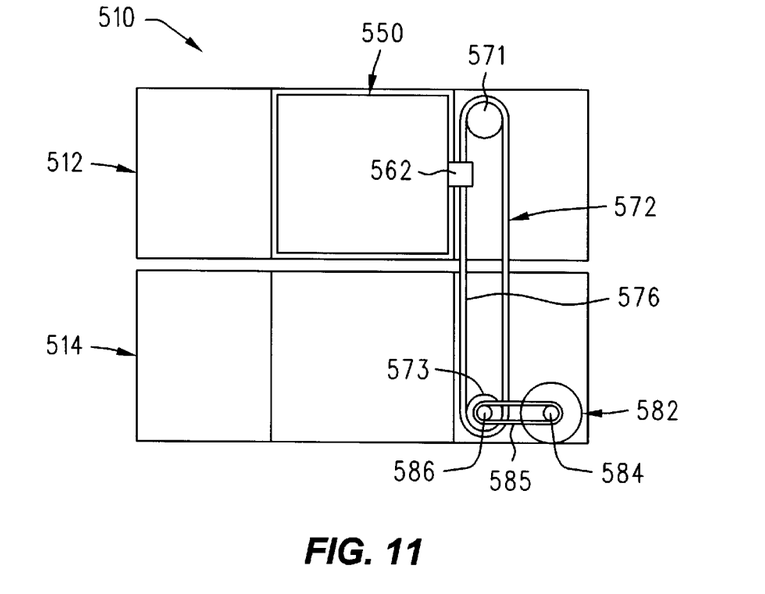
FIG. 11 is a schematic side elevation view of another embodiment of a modular data storage system.

Another embodiment of a modular data storage system is illustrated in FIG. 11. In this embodiment the data storage system 510 has first and second stacked modules 512, 514 and a picker 550 displaceable therebetween. The assembly 510 may be generally identical to that shown in FIG. 4 except that the picker 550 has a belt clamp 562 fixedly mounted thereon rather than a lead screw nut and the belt clamp 562 is fixedly attached to a portion of a drive belt 572 which may be an endless belt mounted on a first pulley 571 and a second pulley 573. The first pulley 571 is rotably mounted in an upper portion of the first module 512 and the second pulley 573 is rotably mounted in a lower portion of the lower module 514. The lower pulley is mounted on a shaft (not shown) which in turn is drivingly connected to a drive motor 582 as by gears 584 on the motor shaft and 586 on the pulley shaft and a drive belt 585 connected therebetween. Rotation of the motor in a first direction causes driving rotation of pulley 573 and thus downward movement of a first length 576 of the drive belt. Rotation of the motor 582 in the opposite direction causes belt length 576 to move upwardly. Thus, belt clamp 562 and attached picker assembly 550 may be moved downwardly and upwardly by rotation of the drive motor 582 in a first and second rotation direction.

Figure 12:
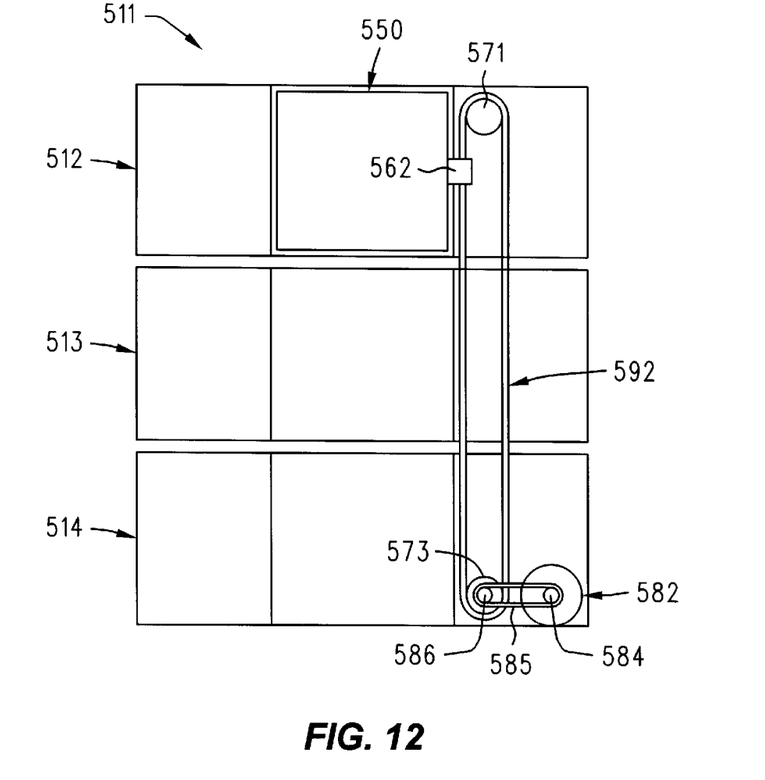
FIG. 12 is a schematic side elevation view of a modular data storage system which is an expansion of the data storage system shown in FIG. 11.
Figure 13:
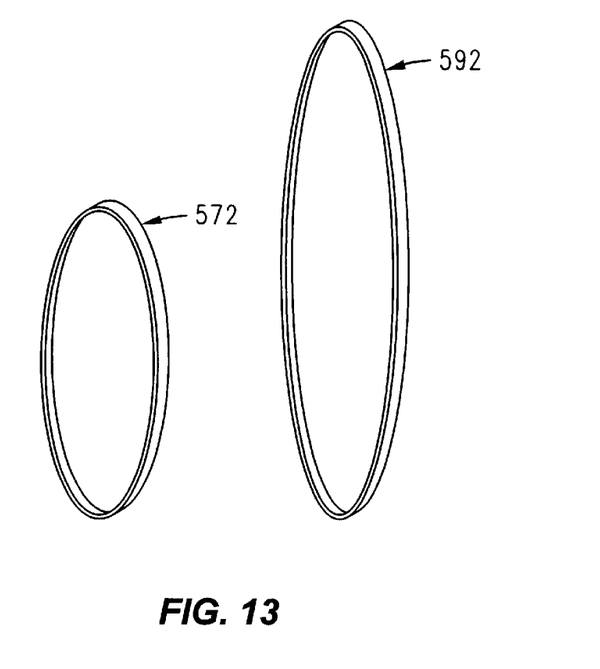
FIG. 13 is a perspective view of two continuous belts used in modular data storage systems of different sizes.

FIG. 12 illustrates an expanded data storage system 511 formed by adding a housing module 513 to original data storage system 510. The expansion may be achieved by replacing drive belt 572 with a longer drive belt 592 after housing module 513 is positioned between the upper and lower housing modules 512, 514. Alternatively, the new module 513 could be stacked on top of module 512 and the pulley 571 mounted in module 512 could be moved and mounted in the upper housing module thus provided. FIG. 13 illustrates original pulley belt 572 and replacement pulley belt 592. It will of course be appreciated that rather than using the flat belts shown in FIG. 13 that any number of different flexible members might be used with properly selected pullies or gears for example, an elastic bearing timing belt, a bicycle type chain, a fiber cable, a timing chain, a cable chain, a 3D belt, a gear drive belt, a gear drive chain, a V belt, or a cable or other variations might be used, as will be readily apparent to those having skill in the art.

Figure 14:
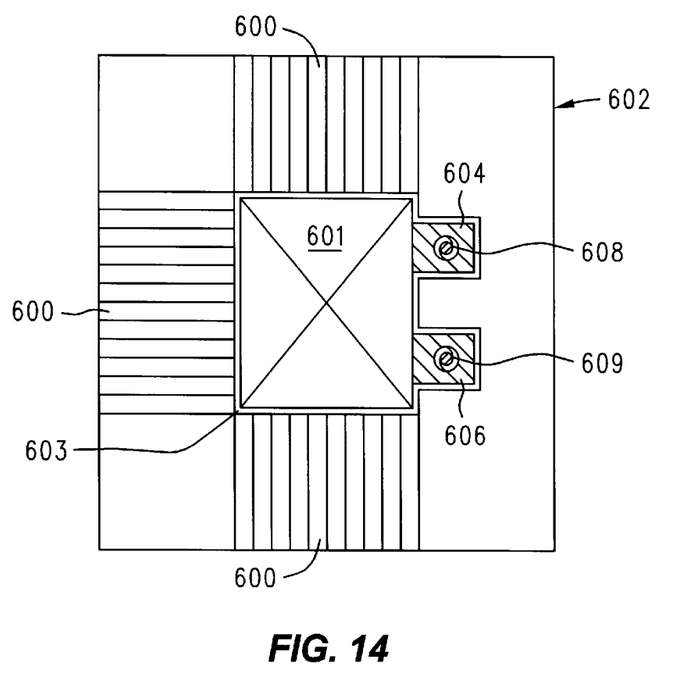
FIG. 14 is a schematic cross sectional top view of a data storage module having a lift mechanism of a first configuration.

Various arrangements of lift mechanisms are illustrated in FIGS. 14 through 17. FIG. 14 is a cross sectional view of a housing module 602 in a housing modular stack. The housing module 602 has data storage locations 600 located adjacent to a picker displacement path 603. An associated picker 601 positioned in the picker displacement path has a pair of picker nuts 604, 606, attached to one side thereof. The nuts are threadingly received in corresponding lead screws 608, 609.

Figure 15:
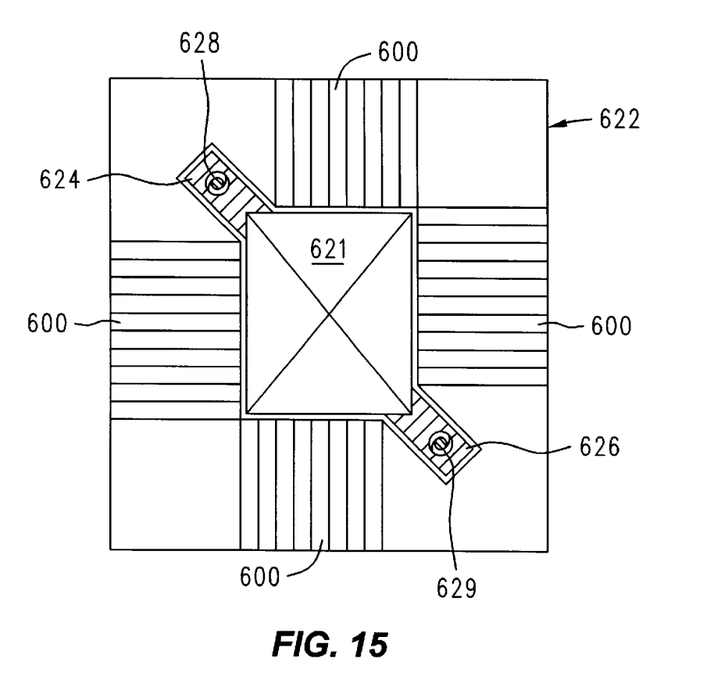
FIG. 15 is a schematic cross sectional top view of a data storage module having a lift mechanism of a second configuration.

FIG. 15 illustrates a top cross sectional view of a housing module 622 in a housing modular stack of a data storage system in which a picker 621 has picker nuts 624, 626 attached to opposite corner portions thereof. The nuts are threadingly received in corresponding lead screws 628, 629.

Figure 16:
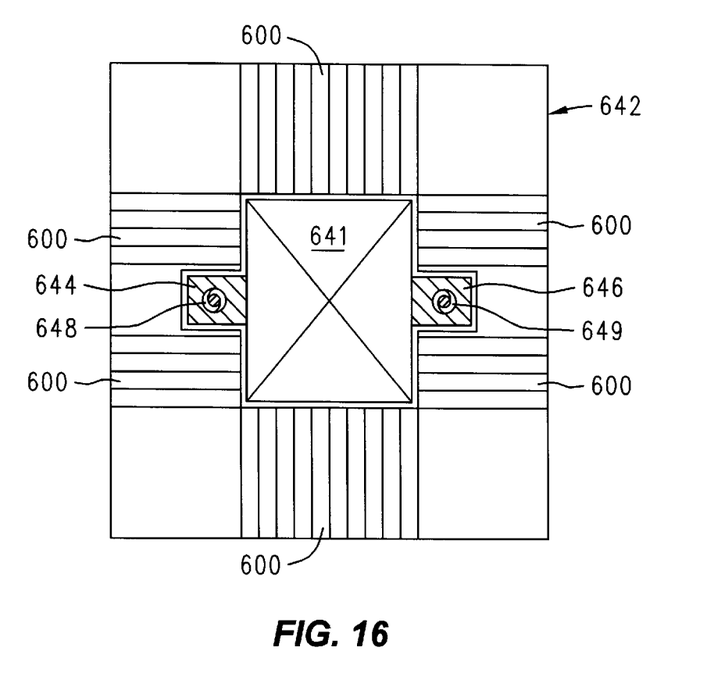
FIG. 16 is a schematic cross sectional top view of a data storage module having a lift mechanism of a third configuration.

FIG. 16 shows a cross section of a housing module 642 in a stacked housing modular array having a picker 641 with picker nuts 644, 646 positioned on opposite lateral sides of the picker 641 with a corresponding lead screw 648, 649 received in each of the picker nuts.

It will be readily appreciated by those having skill in the art that, rather than picker nuts and lead screws, belt clamps and lift belts might be substituted in each of the embodiments described with reference to FIGS. 14 through 16.

Figure 17:
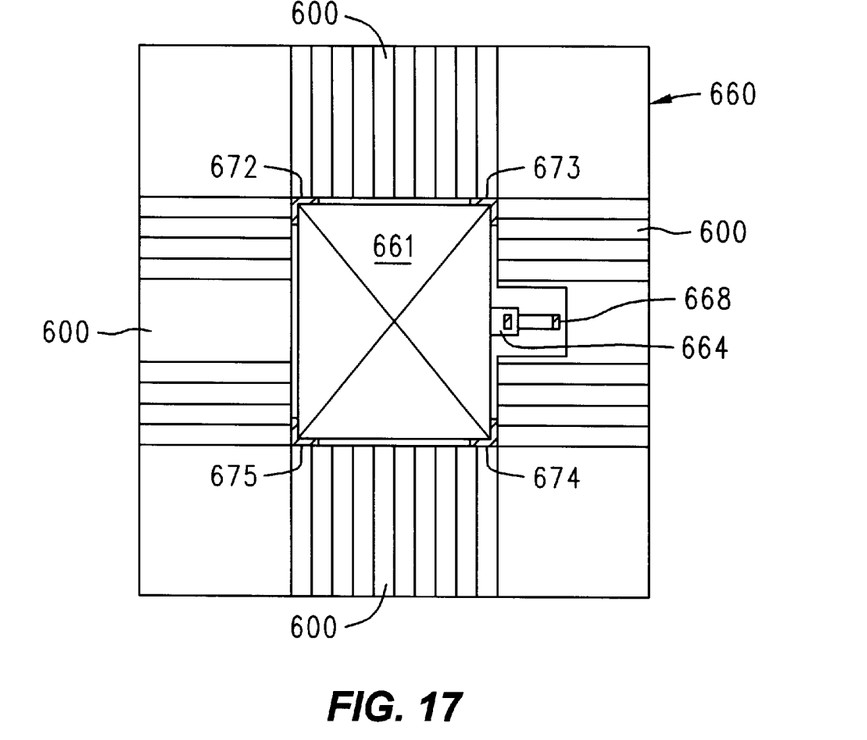
FIG. 17 is a schematic cross sectional top view of a data storage module having a lift mechanism of a fourth configuration.

FIG. 17 illustrates a housing module 660 in a modular data storage system having a displaceable picker 661 mounted in a displacement path on guide rails 672, 673, 674, 675. A single drive belt 668 is attached to a belt clip 664 which is in turn attached to one lateral side of the picker 661. Such guide rails may be slide type, roller type or any other type guide rails and could be used in any of the other embodiments disclosed herein.

Figure 18:
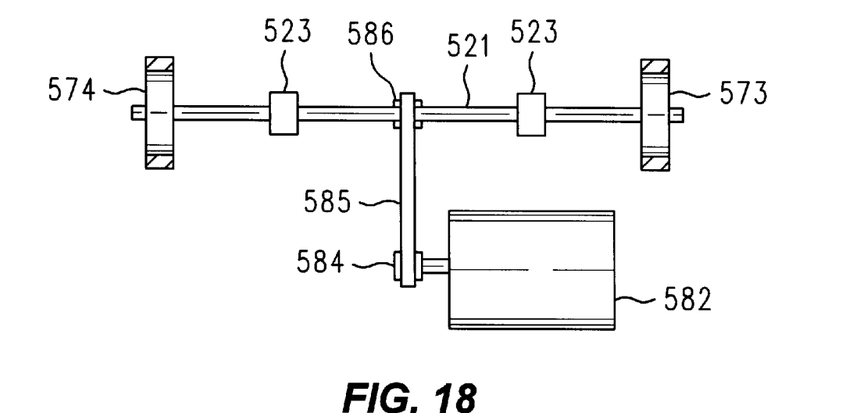
FIG. 18 is a schematic top view of a drive motor and linkage for a dual belt lift mechanism for a modular data storage system.
Figure 19:
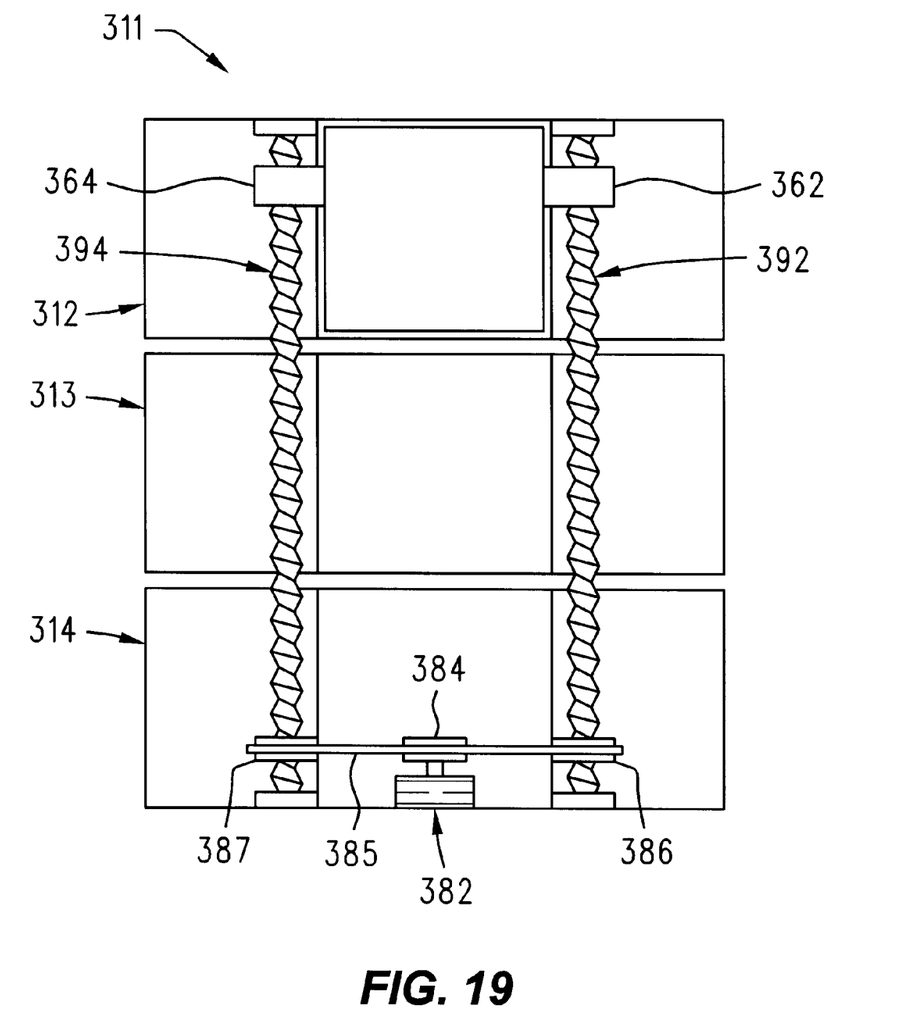
FIG. 19 is a schematic side elevation view of a modular data storage system with dual lead screws and a drive motor and linkage therefor.

FIG. 18 is a schematic top view representation of a drive assembly for a dual belt vertical lift mechanism. The drive system includes a drive motor 582 having a drive gear 584 mounted on a shaft portion thereof. A second gear 586 is mounted on a pulley shaft 521 journaled to fixed supports 523. Gears 584, 586 are drivingly connected as by drive belt 585. Shaft 521 has a first pulley 573 mounted at one end thereof and a second pulley 574 mounted at a second end thereof. The pullies 573, 574 are in turn associated with drive belts which may be connected as illustrated in FIGS. 11 and 12 to associated upper pullies. A picker assembly is in turn attached to the two belts. FIG. 19 illustrates the expanded data storage system 311 of FIG. 5 provided with two lead screws 392, 394 and two picker nuts 362, 364 rather than one. In this embodiment drive motor 382 has a rotable shaft upon which is mounted a gear 384 which in turn is drivingly connected as by chain 385 to gears 386, 387 mounted on the lead screws 392, 394 respectively. It will be appreciated that vertical displacement of the two nuts 362, 364 will occur simultaneously and in the same amount as a result of motor rotation. In yet another configuration (not shown) a different drive motor may be operably attached to each lead screw and the two motors may be controlled in a phase locked loop such that each motor will provide identical and simultaneous rotational displacement of the corresponding lead screw and thus identical vertical displacement of the associated lead screw nut. The same dual motor configuration might also be used in dual belt assemblies.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

We claim:

1. An expansion kit for a data storage system which includes an original plurality of vertically stacked modular housing units, each modular housing unit comprising a plurality of data storage media receiving devices; a data storage media handling device adapted to laterally displace media between said media receiving devices; and an original vertical lift mechanism attached to said data storage media handling device and adapted to vertically displace said handling device along a vertical displacement path extending adjacent to said vertically stacked modular housing units and comprising a drive assembly fixedly positioned with respect to said modular housing units and an original linkage mechanism connected between said drive assembly and said handling device comprising:

at least one additional modular housing unit connectively stackable with said original vertically stacked housing units; and a linkage mechanism replacement unit having a configuration dependent upon the number of modular housing units in said data storage system and operably connectable between portions of said original vertical lift mechanism when said at least one additional modular housing unit is operably stackable connected with said original vertically stacked modular housing units;

wherein said original linkage mechanism comprises an original lead screw and wherein said linkage mechanism replacement unit comprises a replacement lead screw.

2. The expansion kit of claim 1 wherein said replacement lead screw comprises a lead screw longer than said original lead screw.

3. The expansion kit of claim 2 wherein said replacement lead screw comprises an integrally formed lead screw.

4. The expansion kit of claim 2 wherein said replacement lead screw comprises a plurality of separate lead screw portions.

5. The expansion kit of claim 4 wherein said plurality of separate lead screw portions comprise at least a portion of said original lead screw.

6. A method of expanding a data storage system which includes an original plurality of vertically stacked modular housing units, each modular housing unit comprising a plurality of data storage media receiving devices; a data storage media handling device adapted to laterally displace media between said media receiving devices; and an original vertical lift mechanism attached to said data storage media handling device and adapted to vertically displace said handling device along a vertical displacement path extending adjacent to said vertically stacked modular housing units and comprising a drive-assembly fixedly positioned with respect to said modular housing units and an original linkage mechanism connected between said drive motor and said handling device comprising:

vertically stackingly adding a modular housing unit to said original plurality of vertically stacked modular housing units; and replacing said original linkage mechanism with a replacement linkage mechanism having a different length, wherein replacing said original linkage mechanism comprises replacing an original lead screw with a longer replacement lead screw.

7. The method of claim 6 wherein replacing said original lead screw with said replacement lead screw comprises forming said replacement lead screw from at least a portion of said original lead screw and a new lead screw component.

* * * * *